Dec. 18, 1934. P. H. HENKEL 1,984,928
METHOD OF FORMING RUBBER BAGS
Original Filed July 28, 1932
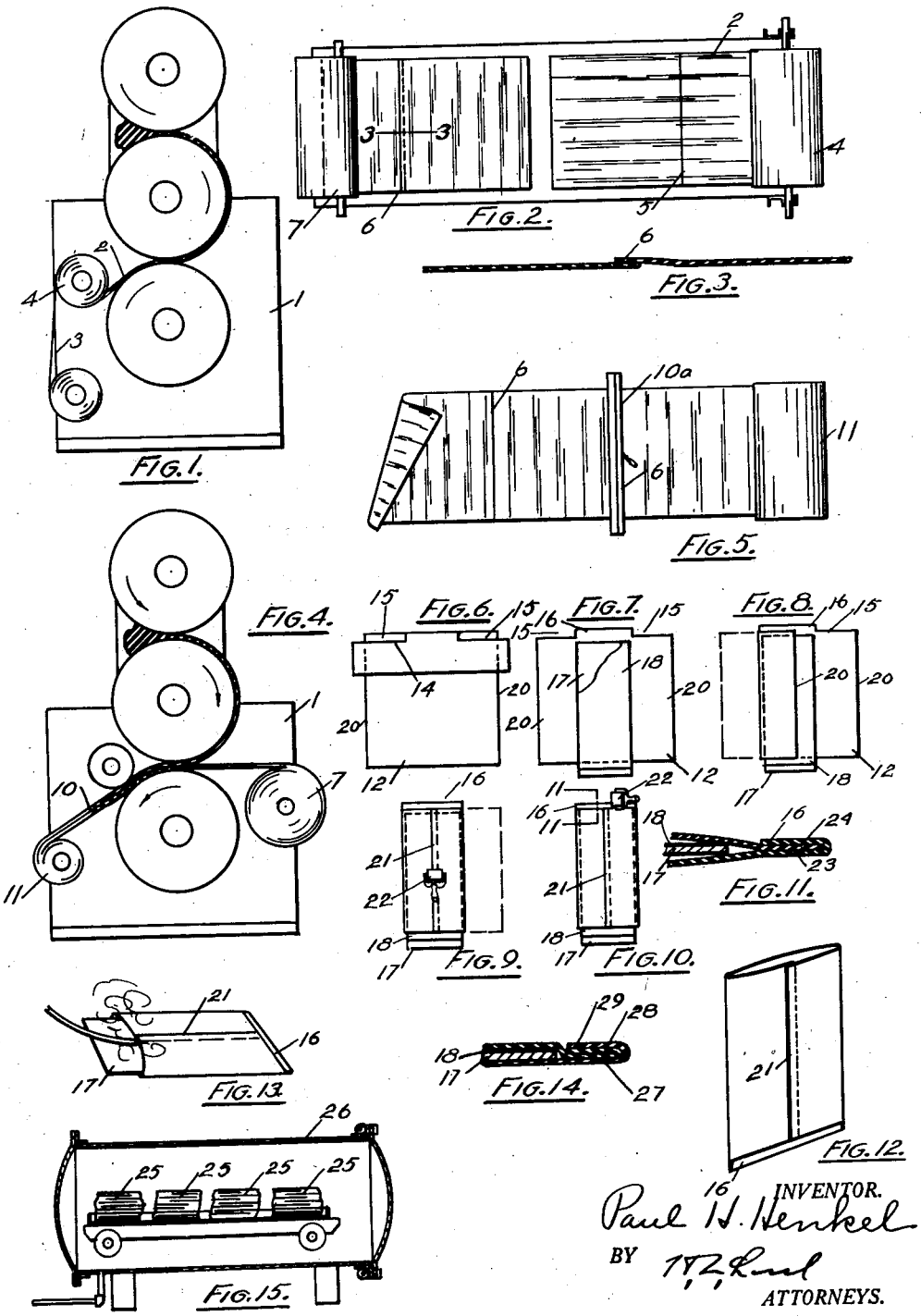

Patented Dec. 18, 1934

1,984,928

UNITED STATES PATENT OFFICE 1,984,928

METHOD OF FORMING RUBBER BAGS

Paul H. Henkel, Erie, Pa., assignor to Continental Rubber Works, Erie, Pa., a corporation of Pennsylvania Application July 28, 1932, Serial No. 625,508
Renewed July 24, 1934

12 Claims. (Cl. 154—2).

The present method is designed to form rubber bags of a type to hold bulk materials, particularly bulk material of powdered nature that are so fine as to practically require impervious material to hold them, or which may have a certain amount of moisture which it is desirable to retain, or which may be of a nature that moisture from without will cause deterioration. In forming such bags it is desirable that the rubber wall forming the bag, if it is to be made of any large capacity shall be so resistant to stretching as to maintain within close limits the general shape of the bag so that it may be more readily piled and more readily handled. To this end the method contemplates a simple means of forming rubber of two plies, the grain of one ply being crosswise to that of the other and consequently strengthening the walls of the bag. The method also contemplates a manner of forming the sheet sections for forming the bag and also the manner of fabricating, or closing the edges and bottom of the bag from the sheet. Features and details of the method will appear from the specification and claims.

A preferred manner of practicing the invention is illustrated in the accompanying drawing as follows:—

Fig. 1 shows an end view of a calender and indicates the formation of a calendered strip of rubber.

Fig. 2 a plan view showing the manner of severing and joining the rubber sheet so as to form a strip with the grain across the strip.

Fig. 3 a section on the line 3—3 in Fig. 2.

Fig. 4 an end view of a calender showing the manner of superimposing the second ply of rubber upon the cross grain strip.

Fig. 5 a plan view showing the manner of severing the two ply strip into bag sections.

Fig. 6 a view showing the manner of forming the bag sheet.

Fig. 7 the arrangement of parts for folding the bag.

Fig. 8 shows the bag partially folded.

Fig. 9 shows the bag formed into a tube with the overlapping edges and the manner of joining the edges.

Fig. 10 shows the tube and manner of forming the fold at the bottom.

Fig. 11 a section on the line 11—11 in Fig. 10.

Fig. 12 a perspective view of the finished bag.

Fig. 13 a view of a modified bag.

Fig. 14 a section showing the manner of forming the bottom of the modified bag.

Fig. 15 a vulcanizing chamber sho ving the manner of vulcanizing the bags.

1 marks the calender, 2 the rubber sheet formed by the calender, 3 an insulating cloth, 4 a roll including the sheet 2 and the cloth. The roll 4 is carried to a work table and the rubber is fed off this roll and severed at intervals, as at 5, and as it is severed it is swung around so as to place the grain crosswise of the strip and the edges are overlapped forming joints 6 and as the strip is formed it is rolled on a roll 7 forming thus a continuous cross grain strip. This roll 7 is mounted in a calender and fed into the calender and as it is fed a strip 9 formed by the calender is superimposed on the cross grain strip forming the two ply strip 10 which is carried on to the roll 11. The roll 11 is carried to the work table and the strip is severed along the joints 6, the sheet being severed at 10a at each side of this joint thus cutting out the part forming the overlap of the joint 6. So that the bag sections of the sheet are free from any flaw incident to such joints. The sheet section 12 thus formed has placed upon it a templet 14 with cut-out portions 15 and with this the bag section sheet is cut out along the bottom from a flap portion 16 at the center to the side edges of the sheet. A templet 17 is then placed upon the sheet, the bottom of the templet being spaced upwardly in the direction of the top of the bag from the cut-out edge 15. The templet has placed upon it insulating paper 18. The edges of the sheet 20 are then folded over the templet forming an overlap 21 which is rolled down by a roller 22 thus uniting the plies along this overlap. The flap 16 is folded over the bottom and this is rolled down and in this operation the inner surfaces of the walls of the bag are united at 23 in a strip along the bag and the flap 16 is united with the outer surface of the opposite wall from that from which the flap extends forming a joint 24. With the bag so formed the templet is withdrawn leaving the insulating paper within the bag. This insulating paper extends down to the joined portion 23. The bags are then arranged in piles 25, placed in a vulcanizer 26 and vulcanized, this not only curing the rubber, but completing the union of the overlapped edges, the seal and fold along the bottom.

The bag may be formed without the cut-out portions 15 by folding back the two side walls at the bottom uniting the inner surfaces of the bottom of the bag at 27 along a strip extending upwardly from the fold and uniting the layers of the fold formed by the side walls at 28 and 29.

In this case the templet is then withdrawn leaving the insulating paper in place and the bag vulcanized in the manner above described.

What I claim as new is:—

1. The method of forming rubber bags which consists in doubling a rubber sheet to form a bag tube, forming a fold at the bottom with the fold surfaces in contact, insulating the walls of the bag, and vulcanizing the bag.

2. The method of forming rubber bags which consists in folding a sheet with its edges in overlapping position and uniting the overlapping edges, forming a fold at the bottom with the fold surfaces in contact, insulating the walls of the bag, and vulcanizing the bag.

3. The method of forming rubber bags which consists in folding a sheet with a flap less than the width of the sheet at the bottom, doubling the sheet to form a bag tube with the edges in overlapping position, folding the flap over the bottom and the opposite side wall, insulating the walls of the bag, and vulcanizing the same.

4. The method of forming rubber bags which consists in doubling a sheet to form a bag tube, forming a fold including the two sides at the bottom, bringing the surfaces of the walls included in the fold into contact, insulating the walls of the bag, and vulcanizing the same.

5. The method of forming rubber bags which consists in doubling a sheet to form a bag tube, uniting the walls of the tube in a strip along the bottom, forming a fold extending from the bottom of the united strip with the fold surfaces in contact, and vulcanizing the bag.

6. The method of forming rubber bags which consists in forming a sheet with a flap less than the width of the sheet at the bottom, doubling the sheet to form a bag tube, joining the walls of the bag in a strip along the bottom, extending the flap around the bottom and into engagement with the opposite wall of the bag, and vulcanizing the bag.

7. The method of forming rubber bags which consists in doubling a sheet to form a bag tube, joining the walls of the bag in a strip along the bottom of the bag, folding the two walls of the bag from the bottom of the united walls with the surfaces of the fold in contact, and vulcanizing the bag.

8. The method of forming rubber bags which consists in forming a two-ply sheet with the grain of one ply crosswise that of the other ply, doubling the sheet and joining the edges and the bottom, and vulcanizing the bag.

9. The method of forming rubber bags which consists in forming a two-ply sheet with the grain of one ply crosswise that of the other ply, doubling the sheet and joining the edges and the bottom with a fold at the bottom, and vulcanizing the bag.

10. The method of forming rubber bags which consists in forming a strip of rubber with the grain lengthwise of the strip, severing the strip into bag sections, at intervals, uniting the severed sections along their longitudinal edges to form a cross grain strip, superimposing and uniting a strip of rubber with the grain longitudinally of the strip forming a two-ply united strip with the grain of one ply crosswise of the other, severing the strip into bag sections at the joints of the cross grain ply, doubling the sheet, joining the edges and the bottom, and vulcanizing the bag.

11. The method of forming rubber bags which consists in forming a strip of rubber with the grain lengthwise of the strip, severing the strip into bag sections at intervals, uniting the severed sections along their longitudinal edges to form a cross grain strip, superimposing and uniting a strip of rubber with the grain longitudinally of the strip forming a two-ply united strip with the grain of one ply crosswise of the other, severing the strip into bag sections at the joints of the cross grain ply, doubling the sheet, joining the edges and closing the bottom by a fold, and vulcanizing the bag.

12. The method of forming rubber bags which consists in forming a strip of rubber with the grain lengthwise of the strip, severing the strip into bag sections at intervals, uniting the severed sections along their longitudinal edges to form a cross grain strip, superimposing and uniting a strip of rubber with the grain longitudinally of the strip forming a two-ply united strip with the grain of one ply crosswise of the other, severing the strip into bag sections at the joints of the cross grain ply and removing the joints from the bag sections, doubling the sheet and joining the edges and the bottom, and vulcanizing the bag.

PAUL H. HENKEL.